Patented Oct. 31, 1933

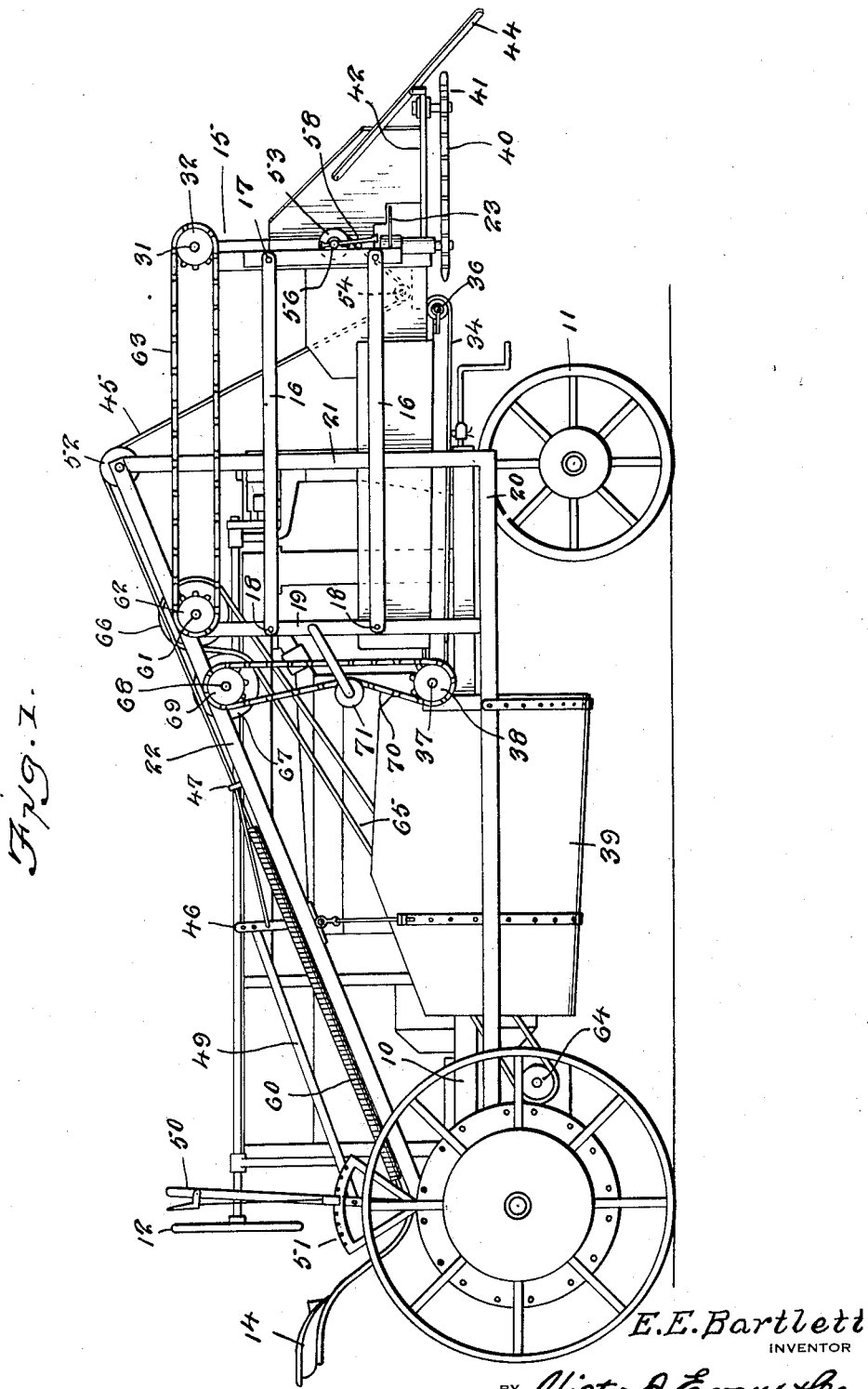

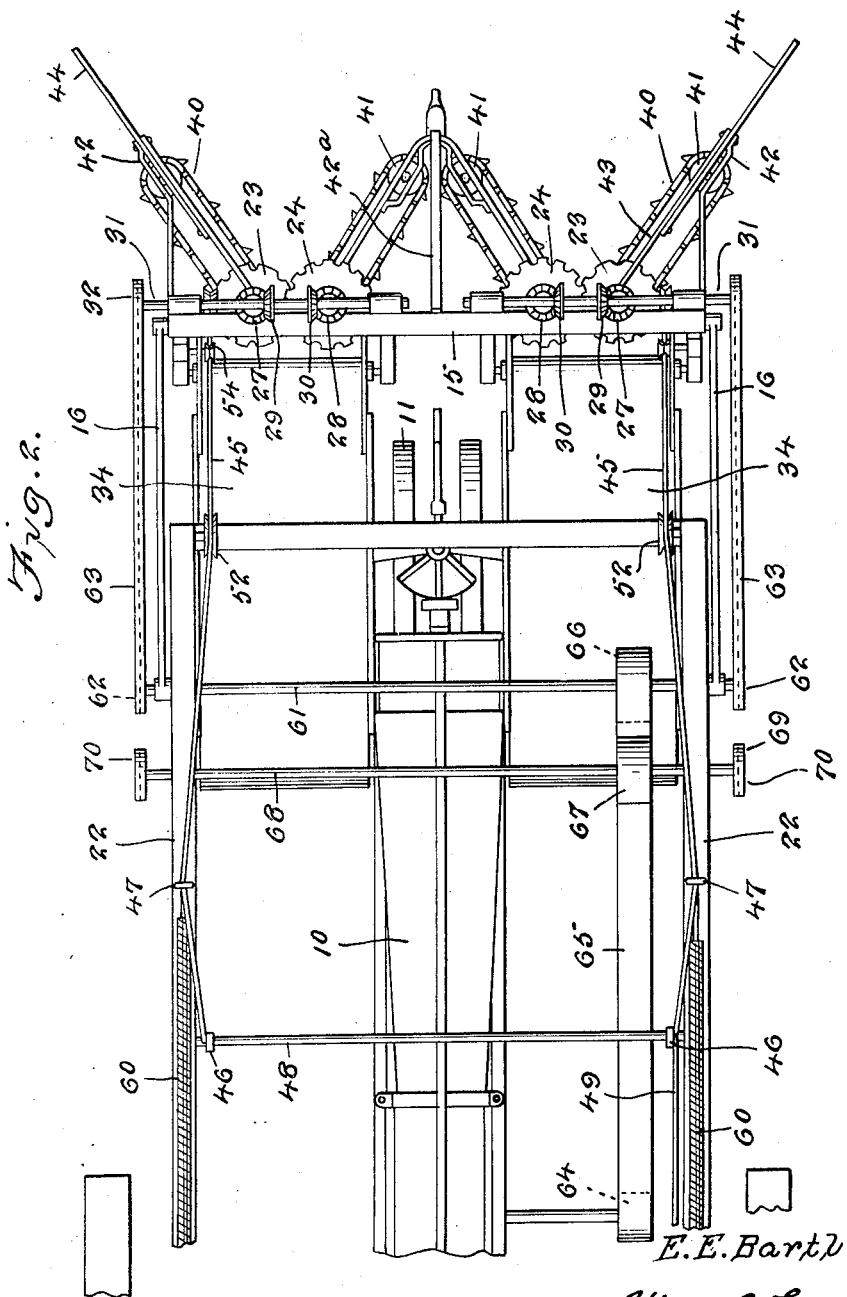

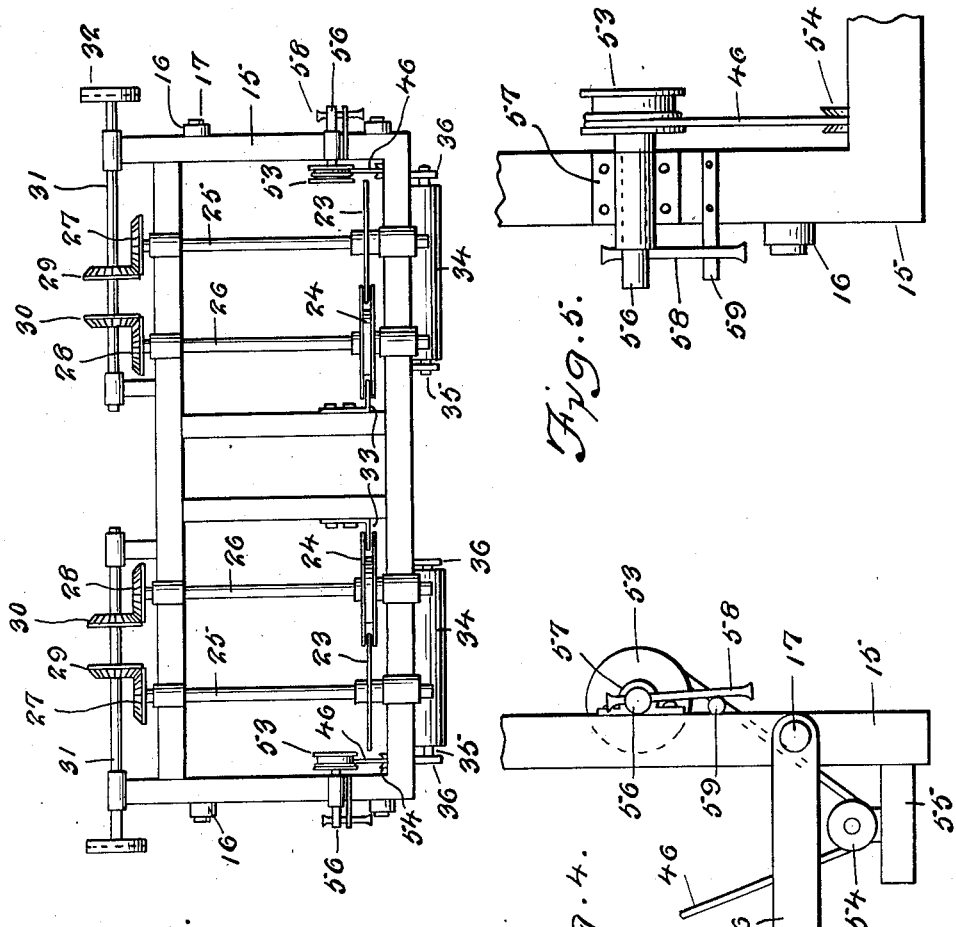

1,933,407

UNITED STATES PATENT OFFICE 1,933,407

GRAIN HEADER

Ernest E. Bartlett, George West, Tex., assignor to B & B Manufacturing Co., Inc., a corporation of Texas Application February 10, 1932. Serial No. 592,160

5 Claims. (Cl. 56—15)

The object of the invention is to provide a grain header constructed in two general units and of such form that the two may be readily incorporated as elements of a conventional tractor, so that a single operator may, by means of the increased capacity, be enabled to head a materially larger acreage of grain; to provide a grain header in which the cutting and feeding apparatus as a whole may be readily lowered or raised by the operator to suit the condition of the grain being operated on and this without the necessity of him having to leave the operator's seat; to provide a cutting and feeding mechanism in an apparatus of this kind in which the driving connections between the tractor and these parts are so constructed that the elevation or lowering of the feeding and cutting mechanism may be accomplished without any change in the relation of the driving connections; and to provide a machine of the kind indicated which is of simple form, comprised of but few parts for apparatus capable of functions of its kind, and which is therefore susceptible of cheap manufacture.

With this object in view, the invention consists in a construction and combination of parts of which a preferred embodiment is illustrated in the accompanying drawings but to which embodiment the invention is not to be restricted. Continued practical use may dictate certain changes or alterations and the right is claimed to make any which do not depart in scope from the appended claims.

In the drawings:

Figure 1 is a side elevational view of a tractor propelled grain header constructed in accordance with the invention.

Figure 2 is a top plan view.

Figure 3 is a front elevational view of the cutter head frame.

Figure 4 is a detail elevational view of the lower portion of the head frame illustrating the take-up for the elevating cables.

Figure 5 is a front elevational view of the structure of Figure 4.

Of dual form, the invention comprises two header units disposed respectively on opposite sides of a conventional farm tractor 10, the steering of which is accomplished with a forward double caster wheel 11 operatively connected with a steering wheel 12 convenient to the operator occupying the seat 14.

Each header unit is identical, but the head frame 15 is common to the two units and is disposed forwardly of the tractor 10, being carried in parallel link bars 16 which are pivotally connected to it on opposite sides as indicated at 17, the rear or heel end of these link bars being pivotally mounted as indicated at 18 on the uprights 19, upstanding from the frame 20, the forward end of which comprises upright bars 21 from which extend the downwardly rearwardly directed bars 22.

By reason of the head frame 15 being carried on the link bars 16, it is susceptible of vertical movement but will always be in vertical position by reason of the parallel relation of the link bars 16.

Each cutter unit comprises a circular blade 23 and spaced parallel blades 24, complemental to the blade 23 and between which the latter blade extends. The blade 23 is mounted on the shaft 25 and the blades 24 on the parallel shaft 26, both the shafts being disposed in vertical positions but in parallel relation and journaled in the head frame, the one carrying at its upper end a beveled gear 27 and the other a beveled gear 28 which are in mesh respectively with the beveled gears 29 and 30 carried on a horizontal shaft 31 journaled in bearings at the top of the head frame and provided at one side of the head frame with a sprocket 32 by means of which motion is communicated to the shaft 31 and thence to the shafts 25 and 26, so that the complemental knives 24 and 23 are rotated.

The head frame 15 carries a guide member 33 bent to provide an extension which enters between the knives 24, to prevent them being bent or deflected out of their normal horizontal planes.

The shafts 26 and 25 rotate in such a direction that the knives 24 and 25 at their overlapping edges move in a rearward direction, so that the grain severed will be deposited on the conveyor belts 34 which are disposed on opposite sides of the tractor and one each behind each pair of cutters. The belts 34, at their forward ends, are trained over drums mounted on shafts 35 journaled in bearings 36 on the underside of the head frame, the rear ends being carried on drums mounted on shafts 37, rotatably mounted in the frame 20 and provided with sprockets 38 by means of which they are set in motion, so that movement is communicated to the belts whereby the material received on them will be transferred to the receptacles 39 disposed at the rear or discharge ends of the belts and which are swung in the frame 20 on opposite sides of the tractor.

Feeder chains 40 arranged in pairs of forwardly diverging units are mounted on the head frame and are driven from the shafts 25 and 26 respectively and the forward ends being trained over idler rolls 41 rotatably mounted in extensions 42 projecting forwardly from the head frame, the extensions serving as supports for the fenders 43 on which are mounted fender extension fingers 44. The center extension 42ª serves as a common support for the idle rollers 41 for the two inside feeder chains.

The head frame would drop by gravity were it not for the particular supporting means for the same, these means consisting of cables 45 terminally anchored to upstanding arms 46 after being trained through guide eyes 47 on the rearwardly directed bars 22. The arms 46 are carried by the rock shaft 48 journaled in the two opposite bars 22 and one of these arms is connected by means of a link 49 with the latch lever 50, the angular position of which is determined by the tooth on the sector 51 with which the latch is engaged. Obviously, the position of the latch lever will determine the position of the arms 46 which, if inclined forwardly, will result in permitting the head frame to be lowered, or if moved backwardly cause the head frame to be elevated, since the cables 45 are secured to the head frame after being passed over idler pulleys 52 rotatably mounted at the upper extremities of the bars 21.

The means for securing the cables to the head frame consist of spools 53 to which the cables are terminally secured, after being passed under idler pulleys 54 rotatably mounted on rearward extensions 55 of the head frame. The spools 53 are secured to shafts 56 journaled in bearings 57 mounted on the head frame, the exterior ends of the shafts 56 being provided with slide handles 58 by means of which the shafts may be turned and thus rotary movement imparted to the spools to wind the cables thereon or to unwind the latter to change the effective length of the same which obviously will change the zone of movement of the head frame.

After the selected amount of cable has been wound on the spools 53 or unwound therefrom, the abutment arms 59 carried by the head frame will prevent any further rotation of the shafts 56 by reason of their obstructing relation with reference to the slide handles 58 after the latter are slid to extend more to one side of the shafts than to the other. Positioning the slide handles to project radially from diametrically opposite sides will clear them from the abutment arms so that the spools may be readily turned.

The effective length of the cables 45 determines, as aforesaid, the zone of adjustment of the head frame, its different positions in this zone being determined by the adjustment of the latch lever with the consequent adjustment of the arms 46 on the rock shaft 48.

The head frame is balanced by means of the springs 60 which are disposed to lie on the bars 22, the springs being anchored one end to the bars and the other end to the cables back of the points where the latter pass through the guide eyes 47.

Since the cutter knives and feed chains are set into motion by means of the shafts 25 and 26 and the latter driven by means of the shafts 31, means must be provided for communicating motion to these latter shafts and this means consists of a transverse shaft 61 rotatably mounted in the frame 20 and having terminal sprockets 62 over which are trained the chains 63, these chains being trained over the sprockets 32. The shaft 61 is driven from the power take-off pulley 64 of the tractor from which a belt 65 is led to a pulley 66 and mounted on the shaft 61. But the belt 65 also serves as a medium for communicating motion to the shafts 37 which drive the feed belts 34 and this is accomplished by having the belt pass under a pulley 67 mounted on a shaft 68 journaled in the frame 20 and provided with terminal sprockets 69 over which chains 70 are trained, these chains being trained also over sprockets 38. Idlers 71 are employed to take up the slack in the chains 70.

It is obvious that when the power take-off pulley 64 is in motion, the shafts 68 and 61 will be driven with the resultant communication of motion to the feeder belts 34 and the feed chains and cutters of the head frame and as the tractor is advanced through the standing grain, it will be pulled inwardly by the extension fingers 44 of the fenders to be directed to the feed chains by which it will be carried toward the knives and then severed to be passed on to the belts 34 from which it will be transferred back to the receptacles 39.

The invention having been described, what is claimed as new and useful is:

1. A grain header comprising a supporting frame, a head frame provided with cooperating cutter knives and means for directing the grain toward said knives, parallel links pivotally connected respectively to the head frame and to the supporting frame to permit up and down movement of the former with reference to the latter, cables terminally connected with the head frame, arms mounted on the supporting frame and operatively connected for synchronous movement and having the opposite extremities of the cables secured to them, means for rocking said arms, and pulleys mounted on the main frame over which said cables are trained, and take-up means for said cables at their points of anchorage on said supporting frame.

2. A grain header comprising a supporting frame, a head frame provided with cooperating cutter knives and means for directing the grain toward said knives, parallel links pivotally connected respectively to the head frame and to the supporting frame to permit up and down movement of the former with reference to the latter, cables terminally connected with the head frame, arms mounted on the supporting frame and operatively connected for synchronous movement and having the opposite extremities of the cables secured to them, means for rocking said arms, and pulleys mounted on the main frame over which said cables are trained, and take-up means for said cables at their points of anchorage on said supporting frame, said take-up means comprising spools rotatably mounted on the head frame and having the extremities of the cables secured to them to permit winding of the cables thereon.

3. A grain header comprising a supporting frame, a head frame provided with cooperating cutter knives and means for directing the grain toward said knives, parallel links pivotally connected respectively to the head frame and to the supporting frame to permit up and down movement of the former with reference to the latter, cables terminally connected with the head frame, arms mounted on the supporting frame and operatively connected for synchronous movement and having the opposite extremities of the cables secured to them, means for rocking said arms, and pulleys mounted on the main frame over which said cables are trained, and take-up means for said cables at their points of anchorage on said supporting frame, said take-up means comprising spools around which said cables are wound and to which they are terminally anchored, slide handles for actuating said spools, and abutment arms against which said slide handles may engage in certain positions of the latter.

4. A grain header comprising a supporting frame, a head frame, cutter knives rotatably mounted in the head frame, feeder chains driven in common with the cutter knives and arranged in forwardly divergent relation with respect to the latter, a conveyor belt mounted at its forward end on the head frame and at its rear end on the supporting frame, parallel links pivotally connected respectively to the supporting frame and to the head frame to insure up and down vertical movement of the latter, cables anchored to the head frame, pulleys mounted on the supporting frame over which said cables are trained, and a manually adjustable rocker mounted on the supporting frame and to which the cables are terminally secured.

5. A grain header comprising a supporting frame, a head frame, cutter knives rotatably mounted in the head frame, feeder chains driven in common with the cutter knives and arranged in forwardly divergent relation with respect to the latter, a conveyor belt mounted at its forward end on the head frame and at its rear end on the supporting frame, parallel links pivotally connected respectively to the supporting frame and to the head frame to insure up and down vertical movement of the latter, cables anchored to the head frame, pulleys mounted on the supporting frame over which said cables are trained, a manually adjustable rocker mounted on the supporting frame and to which the cables are terminally secured, and a common driving means for actuating the conveyor belt and said cutters.

ERNEST E. BARTLETT.